US008897410B2

(12) United States Patent
Cadic

(10) Patent No.: US 8,897,410 B2
(45) Date of Patent: Nov. 25, 2014

(54) DEVICE FOR RECEIVING A DIGITAL SIGNAL

(75) Inventor: Pascal Cadic, Rennes (FR)

(73) Assignee: Diwel, Rennes (FR)

( * ) Notice: Subject to any disclaimer, the term of this patent is extended or adjusted under 35 U.S.C. 154(b) by 44 days.

(21) Appl. No.: 13/590,278

(22) Filed: Aug. 21, 2012

(65) Prior Publication Data
US 2013/0215943 A1 Aug. 22, 2013

(51) Int. Cl.
*H04L 7/00* (2006.01)
*H04L 7/04* (2006.01)

(52) U.S. Cl.
CPC .............. *H04L 7/0079* (2013.01); *H04L 7/046* (2013.01); *H04L 7/042* (2013.01)
USPC ....................................................... 375/355

(58) Field of Classification Search
USPC ........... 375/340, 342, 362, 365; 370/503, 509
See application file for complete search history.

(56) References Cited

U.S. PATENT DOCUMENTS

| 4,596,024 | A | | 6/1986 | Thomson |
| 5,052,026 | A | | 9/1991 | Walley |
| 5,151,925 | A | * | 9/1992 | Gelin et al. .................... 375/328 |
| 5,739,762 | A | * | 4/1998 | Kuramatsu et al. ............ 340/7.1 |
| 6,633,753 | B1 | * | 10/2003 | Kido .......................... 455/343.2 |
| 7,194,055 | B2 | * | 3/2007 | Tandai et al. ................. 375/368 |
| 2002/0168034 | A1 | | 11/2002 | Yang et al. |
| 2006/0023749 | A1 | * | 2/2006 | Yoshizawa et al. ........... 370/470 |
| 2007/0135079 | A1 | | 6/2007 | Bromley |
| 2012/0163480 | A1 | * | 6/2012 | Nemeth et al. ................ 375/259 |

FOREIGN PATENT DOCUMENTS

| EP | 2395725 | 12/2011 |
| WO | 2010/091556 | 8/2010 |

OTHER PUBLICATIONS

Search Report for French Priority Application No. 11/57507, all pages, dated Apr. 27, 2012.
Schrempp et al. "Unique Word Detection in Digital Burst Communications" *IEEE Transactions on Communication Technology*, vol. COM-16, No. 4, pp. 597-605 (1968).

* cited by examiner

*Primary Examiner* — Khanh C Tran
(74) *Attorney, Agent, or Firm* — Nixon & Vanderhye, PC

(57) ABSTRACT

The present invention concerns the field of digital signal receivers provided with means of synchronisation with the transmitter and more particularly digital synchronisation means. The invention describes a synchronisation method solely based on the measurement of the frame time and the bit time in accumulators. These measurements are used to adjust the sampling clock of the receiver.

11 Claims, 2 Drawing Sheets

DEVICE FOR RECEIVING A DIGITAL SIGNAL

This application claims priority to French Application No. 11/57507, filed 25 Aug. 2011, the entire contents of which is hereby incorporated by reference.

BACKGROUND OF THE INVENTION (1) Field of the Invention

The present invention concerns the field of digital signal receivers provided with means of synchronisation with the transmitter and more particularly digital synchronisation means.

(2) Description of Related Art

The context is the transmission of a bit stream consisting of a series of bits that can take the value 0 or 1. This bit stream is generated by the transmitter at a period defined by its internal clock.

The receiver, in order to succeed in receiving the transmitted signal, must be in a position to sample the bits sent while complying with the period of the transmitter. The receiver has its own internal clock. It is necessary to synchronise these clocks in order to compensate for any drift due to limited precision of the components.

This synchronisation may be done by means of a common external reference, typically the reception of a clock signal transmitted by the global positioning system (GPS).

Using an analogue solution is also known. From information injected into the signal by the transmitter, a local precision oscillator is adjusted continuously in order to align its frequency on the frequency of the transmitter. This is done by means of components of PLL (Phase Locked Loop) or VCO (Voltage Controlled Oscillator) type.

These solutions require components with a cost that is high for simple embodiments.

BRIEF SUMMARY OF THE INVENTION

The invention aims to solve the above problems by a synchronisation method solely based on the measurement of the frame time and the bit time in accumulators. These measurements are used for adjusting the sampling clock of the receiver.

The invention concerns a device for receiving a digital signal in the form of a bit stream forming frames of fixed length comprising a preamble consisting of a fixed number of 0 and 1 bits in alternation, a bit synchronisation word comprising an isolated transition, a frame synchronisation word reproducing a given value and useful data, which comprises means for detecting the preamble making it possible to supply a measurement of the transmission time of a frame and the moment of the frame start; symbol detection means for aligning the receiver on the frame starts and acquisition means for sampling each bit of the signal.

According to a particular embodiment of the invention, the device also comprises phase adjustment means for precise fixing of the bit clock on the signal received.

According to a particular embodiment of the invention, the device also comprises at least one accumulator for making measurements, said accumulator consisting of at least one register in which a predetermined number "N" of measurements are accumulated, the result of the measurement being given by the accumulated value divided by this number "N" of measurements.

According to a particular embodiment of the invention, said accumulator consists of a plurality "R" of such registers, the initialisation of the registers being offset in time so as to make it possible to obtain a result every "N/R" measurements.

According to a particular embodiment of the invention, the device comprises means for accumulating the same measurement within a set of accumulators functioning with values "N" of the number of measurements that are accumulated before supplying a different result.

According to a particular embodiment of the invention, the device also comprises means for validating a measurement before accumulating it, consisting of comparing the measurement with the previous measurement validated and validating it only if the difference is below a threshold.

According to a particular embodiment of the invention, the preamble detection means comprise means for detecting a sufficient number of successive transmissions between the values 0 and 1; means for detecting the isolated transition of the bit synchronisation word; means for accumulating in an accumulator the moment of reception of this isolated transition and means for supplying a measurement of the frame time when the accumulator has accumulated a sufficient number of measurements, as well as the moment of frame start.

According to a particular embodiment of the invention, the symbol detection means comprise means for detecting the frame synchronisation word; means for accumulating in an accumulator the difference between the detected position and the theoretical position given by a calculation based on the frame time and frame start measurements supplied by the preamble detection module and means for correcting the frame start moment by the difference in bits obtained.

According to a particular embodiment of the invention, the acquisition means comprise means for sampling the bits of a frame from frame start information and the theoretical bit time.

According to a particular embodiment of the invention, the phase adjustment means comprise means for detecting the transitions from the value 0 to the value 1 and from the value 1 to the value 0 in the preamble; means for accumulating in an accumulator the difference between the moment of the transition detected and the moment calculated and means for correcting the frame start moment by one unit of the local clock of the receiver when a difference is validated by said accumulator.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION OF THE INVENTION

Figure 1:
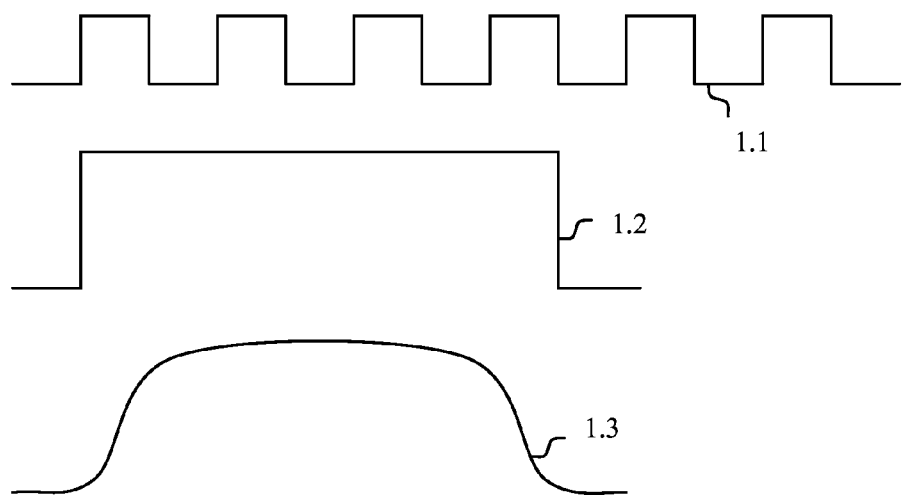
FIG. 1 illustrates the signals used in a data transmitter according to an example embodiment of the invention.

FIG. 1 illustrates the signals used in a data transmitter. The transmitter has a local clock 1.1 functioning at its natural frequency. This clock suffers a drift in time and has a precision dependent on the quality of the components used. From this local clock, a bit clock is defined that defines the frequency of transmission of the bits of the signal to be transmitted. This signal is illustrated by the curve 1.2, which represents an ideal version of this clock. This bit clock has a period that is typically an integer multiple of the period of the base clock 1.1. In the example shown, the bit clock 1.2 has a period of 7 times the base clock.

The curve 1.3 shows the change in the real signal during the transmission of a bit. By comparison with the theoretical signal 1.2, it can be noted that the transitions between state 1 and state 0 cannot be clearly vertical. It is therefore important for a measurement of the reception signal to occur on the central part of the bit time in order to signify the value of the bit.

The receiver has its own local clock. This is theoretically identical to the clock of the transmitter. However, because of the limited precision of the components, the periods of the clocks of the transmitter and receiver are never perfectly identical. Moreover, the clocks drift according to their environment and more particularly the temperature, the variation in their supply voltage, impacts or vibrations. In fact, it is therefore not possible to rely on local clocks to guarantee reception of the signal transmitted in the absence of a clock synchronisation mechanism.

It is therefore necessary to compensate for the absolute difference in frequency between the transmitter and the receiver, to compensate for the drift in local time with respect to the time of the transmitter and best position the moment of acquisition of the data in order to overcome the degradation of the signal transmitted. The latter point consists of positioning as close as possible to the middle of the bit time for acquisition thereof.

The solution proposed is purely digital, it uses only the processing resources available and does not require any additional component of the PLL or other type. The only constraints imposed are firstly being in a position to detect a transition of the signal transmitted and secondly that the local clock of the receiver has a frequency higher than the frequency of the transmitted signal in order to make sufficiently precise time measurements.

Figure 2:
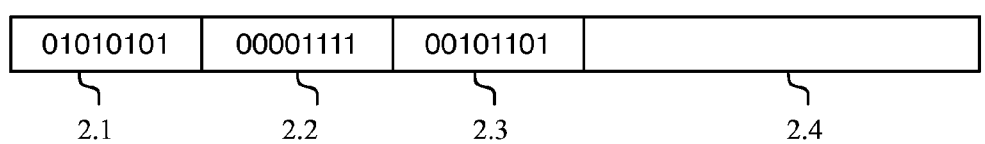
FIG. 2 illustrates the structure of the frame in an example embodiment of the invention.

According to the example embodiment of the invention, the data are sent in the form of a bit stream consisting of frames of fixed length. The structure of the frame used is illustrated by FIG. 2. It is composed of a first part called the preamble and referenced 2.1. This preamble consists of a fixed and sufficiently high number of 1 bits and 0 bits in alternation. It serves to detect the start of a frame and to measure the bit period of the signal transmitted. The length of the preamble will be chosen as a compromise between the need to be long enough for a correct measurement of the period of the signal and the need not to excessively burden the bandwidth used.

The frame next comprises a bit synchronisation word 2.2 composed of several bits at 0 followed by several bits at 1, or vice versa. This word offers an easily detectable isolated transition. This transition will serve to measure the transmission time of the frame.

The frame next advantageously comprises a frame synchronisation word 2.3. This word reproduces a given value in order to mark the start of the frame.

Finally, the frame comprises useful data 2.4 (the payload) to be transmitted.

The system requires measuring with precision the bit time and the frame time, that is to say the transmission time of a bit and the transmission time of a frame. These times are measured by integer arithmetic the unit of which is the local clock of the receiver. This local clock is a multiple of the transmission clock but typically the multiplication factor is low, lying between 2 and a few tens. A direct measurement of these times therefore involves a relatively large measurement error.

To overcome this imprecision, the measurement will be done by means of an accumulator. That is to say it is not the transmission time of a bit or a frame that is measured, but the transmission time of a number "n" of bits or frames. Next, the bit time and the frame time are obtained by integer division of the time measured by the number of bits or frames transmitted. The precision is dependent on the number "n" of occurrences measured. This precision is obtained at the expense of the time taken by the measurement. For example, in a system transmitting at 2 Mbits/s with "n" equal to 250,000, a new measurement of the bit time is obtained every 125 ms. This period may be detrimental for monitoring frequency drifts in the short term.

To overcome this problem, a measurement accumulator system is established. An accumulator is composed of a battery of "R" registers. At each measurement, the result is added to each of the registers. As soon as a register has accumulated "N" measurements, an average is available that can be calculated by the integer division of the value of the register divided by the number "N" of measurements. In this way, a quotient and a remainder are obtained, which must be taken into account during successive uses of the accumulator in order to preserve precision thereof. The register is then reset to 0. The result of the measurement is therefore given by the accumulated value divided by this number "N" of measurements.

Each register therefore produces a result every "N" measurements.

If it is ensured that the initialisation of each register is offset in time, it is possible to obtain a result every "N/R" measurements.

Figure 3:
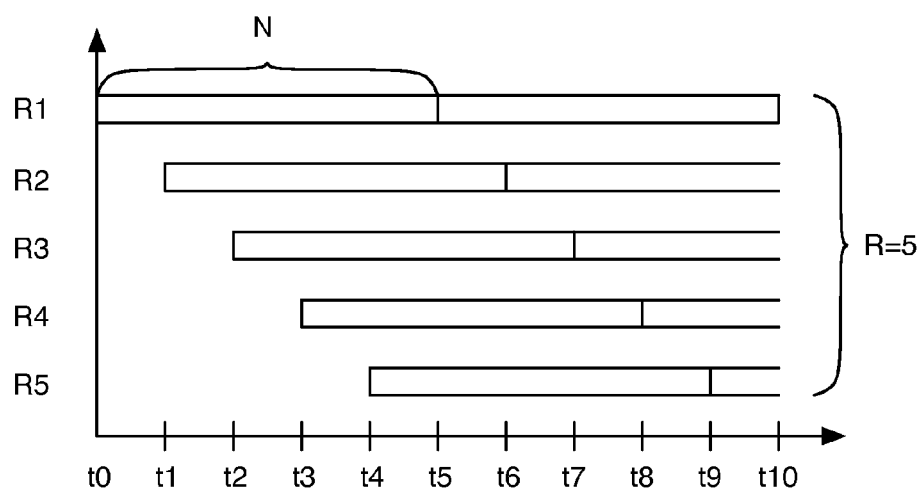
FIG. 3 illustrates the structure of an accumulator according to an example embodiment of the invention.

Such an accumulator is illustrated by FIG. 3, the time elapsing horizontally. At time t0 the first register R1 is initialised to 0. At time t1 the second register R2 is initialised to 0. At time t2 the third register R3 is initialised to 0. At time t4 the fifth register R5 is initialised to 0. At time t5, the first register R1 generates a first measurement and is reinitialised to 0. At time t6, the second register R2 generates a first measurement and is reinitialised to 0. At time t7, the third register R3 generates a first measurement and is reinitialised to 0. At time t8, the fourth register R4 generates a first measurement and is reinitialised to 0. At time t9, the fifth register R5 generates a first measurement and is reinitialised to 0, and so on.

It is thus possible to combine a good precision of the measurements by means of a high value of "N" and a rapid frequency of obtaining these measurements by means of a relatively high value of "R". It is possible to determine these values of "N" and "R" according to the precision and frequency of measurement required. If "R=1", an accumulator is found having a single register and producing a result every "N" measurements, advantageously "R" is greater than 1.

Advantageously, in order to make the results reliable, particularly when there are very noisy transmissions, an additional validation step occurs. The accumulator system described produces a result every "N/R" measurements. Each of the results produced will be subjected to a validation step. According to the result of this validation, the result will be kept and used if the result is considered to be valid and rejected if it is considered to be invalid.

This validation step may consist of measuring the difference between the last result produced and the previous result produced and validated, and it is then considered that the last result is valid if the difference is below a threshold. It is possible to take as the threshold value the precision of the accumulator for example.

Advantageously, if a number, above a given threshold, of successive results are considered to be invalid, the accumulator is marked as invalid and the new results are compared with the last results produced independently of their validity. If a sufficient number of measurements are then validated, the accumulator is once again marked as valid.

These accumulators are used in the receiver for measuring the frame times and the bit times as well as the phase of the signal received. The receiver functions according to two modes. In a first mode, referred to as the synchronisation search mode, the receiver attempts to detect the transmission parameters, typically the frequency of transmission, the bit alignment and the start of the frame. It is only after having detected these parameters that it can go into a so-called acquisition mode that enables it to read the signal received. It is then said that it is synchronised on the transmitter. The receiver then continues to make various measurements that will enable it to remain synchronised.

Figure 4:
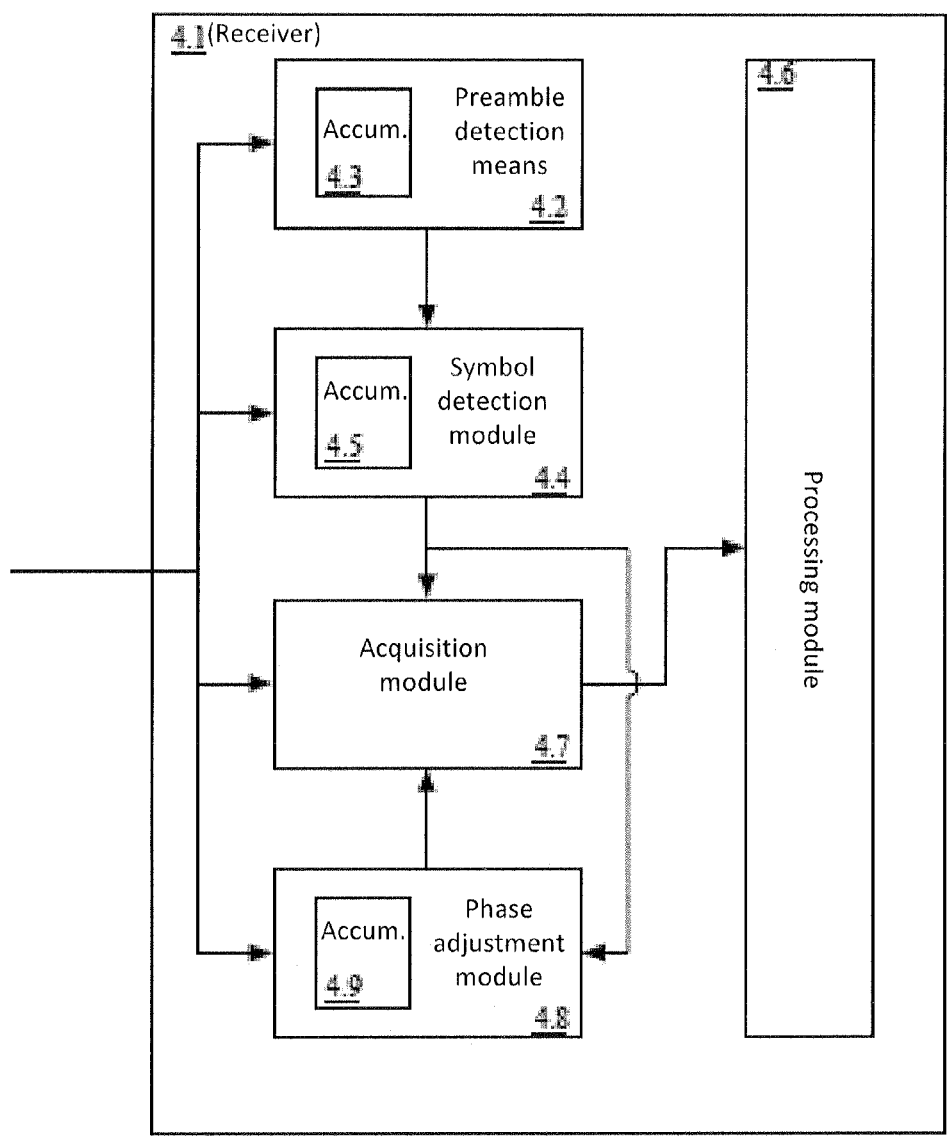
FIG. 4 illustrates the structure of the receiver according to an example embodiment of the invention.

FIG. 4 illustrates a receiver according to a particular embodiment of the invention.

The receiver 4.1 has means 4.2 for detecting the preamble. These means are implemented in the form of a preamble detection module. The purpose of this module is to provide a measurement of the frame time, that is to say the transmission time of a data frame, as well as the frame start moment.

To do this, the preamble detection module comprises at least one accumulator 4.3 for calculating the frame time. Advantageously, it has a set of accumulators of different sizes. The size of the accumulator is defined as the number of measurements that are accumulated before providing a result. Using different sizes of accumulators makes it possible to rapidly obtain, by means of the accumulators of small size, a first measurement of the frame time that is not very precise. As time passes, the larger accumulators give more and more precise measurements of this time.

It is considered that the transmitter sends data at the bit frequency $F_{rx}$, conformed as frames of length $L_{frame}$. The receiver has a local clock of frequency $L_{local}$ and must generate the reception bit frequency $F_{rx}$. $F_{local}=N*F$ where N is an integer multiplying coefficient.

The receiver samples the incoming data on its local clock at a frequency $F_{local}$ higher than the bit frequency. It attempts to detect the successive transitions of the input signal that correspond to the transitions from the value 0 to the value 1 and from the value 1 to the value 0 present in the preamble.

At this moment, the system attempts to validate the fact that it is indeed the preamble, that is to say that it is detecting a sufficient number of successive transmissions. If the validity of the preamble appears plausible, the system then seeks the isolated transition from 0 to 1 present in the bit synchronisation word. This search is limited in time. If this transition is not found, the system starts to seek the preamble again.

When the isolated transition is detected, the moment of this transition is stored in the accumulator, or the set of accumulators, 4.3. As soon as a measurement of the frame time is available, it is possible to be positioned directly at the start of the following frame for a new detection of the preamble and the isolated transition. The preamble detection module then goes into an acquisition mode. In fact, one positions oneself slightly before the theoretical following frame start moment in order to guarantee the functioning of the system. The frame time measurements are therefore accumulated in the set of accumulators 4.3, which gives a more and more precise measurement thereof as the larger accumulators are validated.

Advantageously, in this acquisition mode, the measurement is validated and stored in the accumulators only if the isolated transition is found with a small offset with respect to its theoretical time position. For example, only an offset of a few bits is tolerated.

This module therefore enables a regular repositioning at the frame start. Its precision is not absolute and an offset of one or two bits occurs regularly.

In order to align the receiver on the frame starts, it has symbol detection means. These means are implanted in the form of a symbol detection module 4.4. This module is responsible for detecting the frame synchronisation word. This word is constant and transmitted at a fixed position in the frame. This module has at least one accumulator 4.5. Alternatively, the bit synchronisation word could also be used because of its isolated transition for the bit readjustment.

When the receiver is in synchronisation search mode, the difference between the detected position and the theoretical position given by a calculation based on the frame time measurements and the frame start moment supplied by the preamble detection module 4.2 is accumulated. Advantageously, a set of accumulators of different sizes is used.

When at least one accumulator is valid for a sufficient length of time, it is considered that a valid difference has been acquired. The frame start time is then corrected by the bit difference obtained and the accumulators are reinitialised. The data acquisition mode is then passed to. In this acquisition mode, detection of the frame synchronisation word is advantageously continued.

Subsequently, the frame start is fixed on to within a bit and it is therefore possible to sample the data and transmit them to the processing module 4.6.

The data acquisition is effected by the receiver using acquisition means in the form of an acquisition module 4.7. The acquisition module uses the frame start moment given by the previous two modules and the theoretical bit time to calculate the sampling moment of each bit of the frame. The acquisition is done by sampling each bit of the signal.

The size of the frame is defined so that the difference in frequency between the oscillator of the transmitter and that of the receiver is less than a part of the duration of a bit over the duration of the frame.

For example, considering a maximum difference of 200 ppm (parts per million) between the two oscillators, there is a shift of one bit every 5000 bits. It is then possible to choose a frame of length 2048 and oscillators the precision of which is greater than 20 ppm. In this case, over the duration of one frame, there will be a maximum shift of less than one fifth of a bit between the start and the end of the frame. If it is ensured that the accumulator positions us correctly at the middle of a bit at the frame start, the instantaneous drift can be masked.

In order to make its data acquisitions, the system awaits the moment given by the accumulator and then regularly adds the time of a bit period. The bit period is given by the multiplication of the factor $N_{rx}$ by the local clock. If the frame start moment given by the accumulator is denoted $T_{acc}(0)$, the bits are sampled at the moments $T_{acc}(0)+N_{rx}*I$, where I is the index of the bit to be sampled in the frame.

Advantageously, the receiver is also provided with phase adjustment means. These means are implanted in the form of a phase adjustment module 4.8. The purpose of this module is to precisely adjust the bit time to within the local clock cycle, to enable sampling of the bit situated substantially at the middle of the bit time. In doing this, the reliability of the reading is improved and the error rate is decreased.

The phase adjustment is done on the preamble in synchronisation search mode and in acquisition mode. The module detects the transitions from the value 0 to the value 1 and from the value 1 to the value 0. Because the preamble consists of an alternating series of value 0 and value 1, the time between two transitions normally corresponds to the bit time. This time is therefore measured and the measurements where this time is distant, beyond a certain threshold, from the theoretical bit time are rejected. For example, a tolerance of perhaps 10% is validated.

When the measurement is validated for a number of measurements above a given threshold, the difference between the moment of the transition measured and the moment calculated by means of an accumulator, that is to say the moment $T_{acc}(0)+N_{rx}*I$, is accumulated in at least one accumulator 4.9. This is continued thus until the accumulator is validated.

When a constant difference is validated, the reader is then corrected using the difference thus measured. Advantageously, to avoid overcorrecting the system, only corrections with a single value of the local clock are accepted. If the difference is greater, it will then be necessary to repeat the process and validate the newer difference before correcting a new value of the local clock. This is continued thus until a zero difference value is obtained. Thus, in a few frames, a precise setting of the bit clock on the signal received is obtained.

These corrections consist of determining a value called Offset that is supplied to the acquisition module. In this embodiment, the acquisition uses the formula:

$$T_{acc}(0)+N_{rx}*I+\text{Offset};$$

in order to determine the bit time. It will be noted that the first bit is then sampled at time $T_{acc}(0)+\text{Offset}$.

The invention thus described makes it possible to synchronise a receiver on a transmitter without using an analogue component. The use of sets of accumulators of variable size affords rapid synchronisation and great precision in steady mode. The invention can be used in any type of receiver, wired or wireless, of modulated digital signals.

The invention claimed is:

1. Device for receiving a digital signal in the form of a bit stream forming frames of fixed length comprising a preamble consisting of a fixed number of 0 and 1 bits in alternation, a bit synchronisation word comprising an isolated transition, a frame synchronisation word reproducing a given value and useful data, characterised in that it comprises:
   preamble detection means for supplying a measurement of the transmission time of a frame and the frame start moment;
   symbol detection means for aligning the receiver on the frame starts;
   acquisition means for sampling each bit of the signal.

2. Device according to claim 1, characterised in that it also comprises:
   phase adjustment means for precise fixing of the bit clock on the signal received.

3. Device according to claim 1, characterised in that it also comprises at least one accumulator for making measurements, said accumulator consisting of at least one register in which a predetermined number "N" of measurements is accumulated, the result of the measurement being given by the accumulated value divided by this number "N" of measurements.

4. Device according to claim 3, characterised in that said accumulator consists of a plurality "R" of such registers, the initialisation of the registers being offset in time so as to make it possible to obtain a result every "N/R" measurements.

5. Device according to claim 3, characterised in that it comprises means for accumulating the same measurement within a set of accumulators functioning with values "N" of the number of measurements that are accumulated before providing a different result.

6. Device according to claim 3, characterised in that it also comprises means for validating a measurement before accumulating it, consisting of comparing the measurement with the previous measurement validated and validating it only if the difference is below a threshold.

7. Device according to claim 3, characterised in that the preamble detection means comprise:
   means for detecting a sufficient number of successive transitions between the values 0 and 1;
   means for detecting the isolated transition of the bit synchronisation word;
   means for accumulating in an accumulator the moment of reception of this isolated transition;
   means for providing a measurement of the frame time when the accumulator has accumulated a sufficient number of measurements, as well as the frame start moment.

8. Device according to claim 3, characterised in that the symbol detection means comprise:
   means for detecting the frame synchronisation word;
   means for accumulating in an accumulator the difference between the detected position and the theoretical position given by a calculation based on the frame time and frame start measurements supplied by the preamble detection means;
   means for correcting the frame start moment by the bit difference obtained.

9. Device according to claim 3, characterised in that the acquisition means comprise:
   means for sampling the bits of a frame from the frame start information and the theoretical bit time.

10. Device according to claim 3, characterised in that the phase adjustment means comprise:
    means for detecting the transitions from the value 0 to the value 1 and from the value 1 to the value 0 in the preamble;
    means for accumulating in an accumulator the offset between the detected transition moment and the calculated moment;
    means for correcting by one unit the local clock of the receiver at the frame start moment when an offset is validated by said accumulator.

11. Method for receiving, by a reception device, a digital signal transmitted in the form of a bit stream forming frames of fixed length comprising a preamble consisting of a fixed number of 0 and 1 bits in alternation, a bit synchronisation word comprising an isolated transition, a frame synchronisation word reproducing a given value and useful data, characterised in that the reception device performs the following steps:
    detecting the preamble for supplying a measurement of the transmission time of a frame and the frame start moment;
    detecting symbol for aligning the receiver on the frame starts;
    acquiring for sampling each bit of the signal.

* * * * *